Sheet 1, 2 Sheets.

E. Hidden.

Ship's Lights.

No. 1,533. Reissued Sept. 8, 1863

N. PETERS, PHOTO-LITHOGRAPHER, WASHINGTON, D. C.

E. Hidden.

Ship's Lights.

{Sheet 2,
{2 Sheets.

No. 1,533.

Reissued Sept. 8, 1863.

Sectional View

N. PETERS, PHOTO-LITHOGRAPHER, WASHINGTON, D. C.

UNITED STATES PATENT OFFICE.

ENOCH HIDDEN, OF NEW YORK, N. Y.

IMPROVEMENT IN SIDE LIGHTS FOR SHIPS.

Specification forming part of Letters Patent No. 9,811, dated June 21, 1853; Reissue No. 1,533, dated September 8, 1863.

*To all whom it may concern:*

Be it known that I, ENOCH HIDDEN, of the city, county, and State of New York, have invented certain new and useful Improvements in Ship-Lights, the same being applicable to the decks as well as to the sides of vessels; and I do hereby declare that the following is a full, clear, and exact description of the same, reference being had to the accompanying drawings, making a part of this specification, in which—

Figure 5:
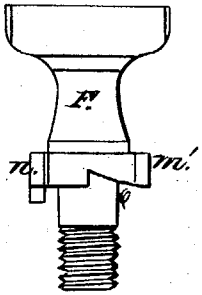
Figure 6:
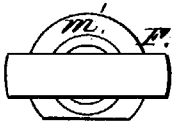
Figure 4:
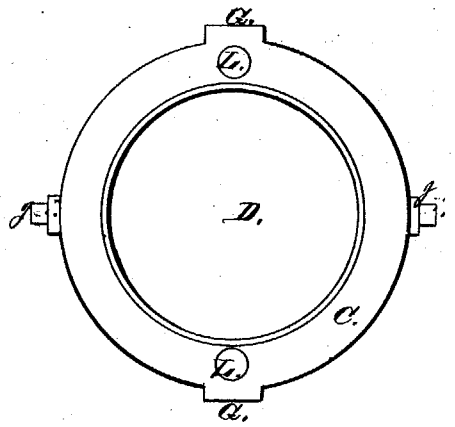
Figure 1:
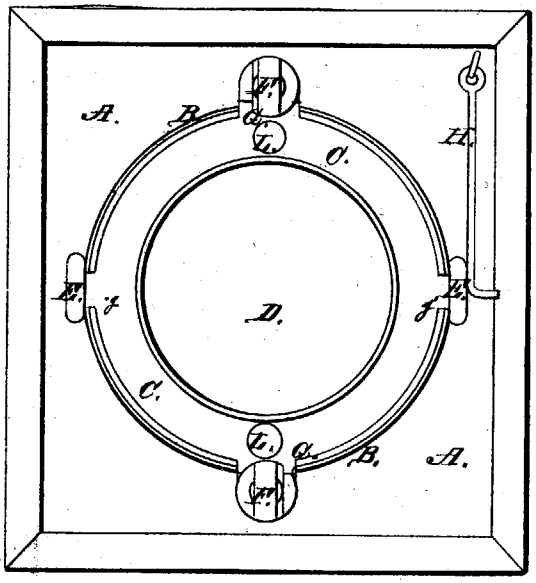
Figure 1:
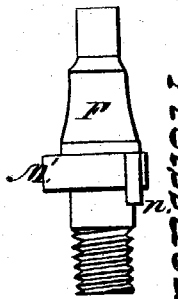
Figure 3:
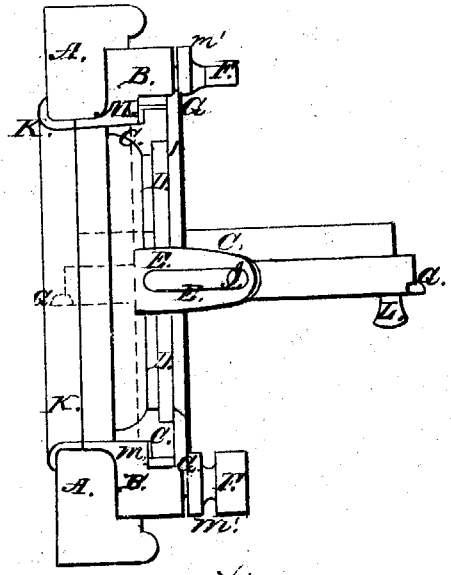
Figure 2:
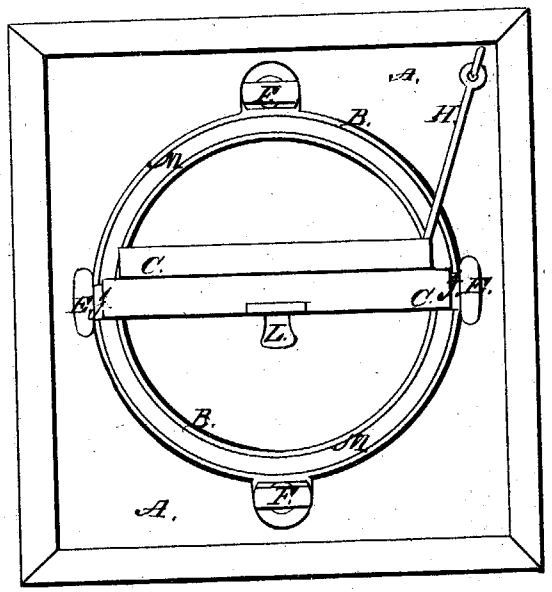

Figure 1 is a front view of my ship-light, in which the glass-frame or glass-cell turns on pivots in slots or chase-mortises in the piece projecting from the face of the main frame when the light is air and water-tight. Fig. 2 is also a front view showing the light-frame or glass-cell at right angles to the ship's side, exhibiting the opening for ventilation. Fig. 3 is a side view of the light in the same position as at Fig. 2, and also a section through the light when shut. Fig. 4 is a front view of the glass frame or cell by itself with the glass in, also showing the pivots on which the glass frame turns, likewise the two projections by which the screw with the combined circular inclined planes secure the light in its place. Figs. 5, 6, and 7 show distinctly the construction of the screw combined with the circular inclined plane which screws the light frame or cell air and water tight to its place.

Similar letters of reference indicate corresponding parts in the several figures.

A A represent a portion of the ship's side; B B, the main frame of the light securely fastened to it by screws or otherwise, and rendered tight by the lead ring or other suitable material, K K, turned over on the outside of the ship, and securely retaining the proper material for making the joint air and water tight with the ship's side.

C C is the movable frame or cell in which the glass is fastened, and turning on its pivots I I in the chase-mortises in the projecting pieces E E, cast on the frame B.

F F are the screws, with the combined inclined planes, which firmly secure the light-frame or glass-cell to its india-rubber seat *m m*, embedded in the main frame of the light, making it air and water tight. The inclined circular planes, or those parts of the screws acting on the projecting parts of the glass frame or cell G G, combined with the regular screwed parts on the points of the screws, complete the securing of the glass cell or frame in its place.

H H is a hook, used for retaining the light in the desired position.

D D represent the glass; L L, the handles or knobs, by which the light-frame is moved in the chase-mortises and turning it on its pivots Figs. 5, 6, and 7 show enlarged views, explaining the construction of the screws, combined with the circular inclined planes, showing their double action, O O being the circular inclined plane.

*n n* is a projecting pin, for stopping the screw in its proper position when the light is to be opened for ventilation.

The operation of the screw F is as follows: The screw F works in the main frame B, as seen in Fig. 3, its flange *m* resting upon the projection G of the glass-frame, and tightening said frame by the working of the spiral O against the upper surface of the projection G, the turning of the screw pressing the inclined planes or spirals close to said surfaces, causing the glass-frame to be drawn against the india-rubber seat *m*.

The above description, it will be seen, refers to the invention applied to the side of a ship only; but as no modification is required in applying it to the deck of a ship, no description referring to such application is deemed necessary.

I do not claim ship-lights turning on pivots or center pins in frames; nor do I claim ship-lights in frames turning on hinges; but I do claim as new and desire to secure by Letters Patent—

1. The arrangement of screws F, tapped into the main frame B, in combination with inclined planes or spirals O, forming part of said screws, that hold the light frame or cell containing the glass fast to the india-rubber in its grooved seat in the main frame, with its stop-pin *n*, for stopping the screw in its proper position when the light is to be opened for ventilation.

2. The projecting ears E, with slots or chase-mortises, in which the pivots of the light-frame or cell turn, allowing the light to be hauled from its seat and consequently out of contact with the india-rubber, so as to allow the plane of the light to be placed at an angle to the main frame, thus freely admitting of ventilation.

3. The arrangment of a lead or other ductile metallic ring soldered on or otherwise joined to the main brass frame of the light, so that it can be turned round the outer edge of the opening in the vessel, securing any suitable material, completely making the main frame of the light water-tight to the vessel, substantially as herein set forth.

ENOCH HIDDEN.

Witnesses:
FRANCIS LOCKWOOD,
GEORGE B. BURR.